MODULATOR-DEMODULATOR AMPLIFIER

Filed April 12, 1962

3 Sheets-Sheet 1

INVENTOR.
JOSEPH MONTNER

BY D. Gordon Angus

ATTORNEY

INVENTOR.
JOSEPH MONTNER
BY
D. Gordon Angus
ATTORNEY

MODULATOR-DEMODULATOR AMPLIFIER

Filed April 12, 1962 3 Sheets-Sheet 3

INVENTOR.
JOSEPH MONTNER

BY D. Gordon Angus

ATTORNEY

United States Patent Office 3,253,228

Patented May 24, 1966

3,253,228
MODULATOR-DEMODULATOR AMPLIFIER

Joseph Montner, Northridge, Calif., assignor to Aerojet-General Corporation, Azusa, Calif., a corporation of Ohio Filed Apr. 12, 1962, Ser. No. 187,052
7 Claims. (Cl. 330—10)

This invention relates to an inverter and more particularly to an inverter employing pulse width modulation as a means of increasing the efficiency, fidelity, reliability, and compactness thereof.

Heretofore inverters have been designed by using a D.-C. power supply to drive a square wave generator. The square wave generator was designed to operate at the frequency of the desired sinusoidal output. Then the output of the square wave generator was changed into a sinusoidal form by means of a tuned circuit or a low frequency filter. This approach had several disadvantages, particularly when the desired sinusoidal output frequency was low (600 c.p.s. or less). The reason is that at low frequencies, the filters required are heavy, bulky, inefficient, and expensive. This disadvantage is particularly serious in aircraft, missile, or spacecraft systems, where weight and space are at a premium and where the heat generated by inefficient power supplies may lead to complications in the cooling system. In addition, the prior inverters were not readily tunable; i.e., the frequency of their output could not be changed without replacing the large tuned filter except by employing variable frequency filters which were still heavier, bulkier, less efficient, and more expensive.

Therefore, one important object of this invention is to provide an inverter which is lighter, more compact, and less expensive then any inverter previously available.

Another object of this invention is to provide an amplifier having both low distortion and high efficiency.

An additional object of this invention is to provide a novel inverter circuit employing pulse width modulation of a high frequency square wave generator as a means for increasing the efficiency, fidelity, reliability, and compactness thereof.

The invention is characterized by using D.-C. power supply to drive a high frequency square wave generator to produce a square wave output signal which is at a substantially higher frequency than the desired output frequency of the inverter. The high frequency output from the square wave generator is pulse modulated in accordance with a small sinusoidal input signal. Then the width modulated pulses are demodulated by a small simple fixed high frequency filter to produce a large output signal having the wave form of the input signal.

Other objects and advantages of the invention will be apparent from the following description of several illustrative embodiments thereof, in connection with the attached drawings, in which.

Figure 1:
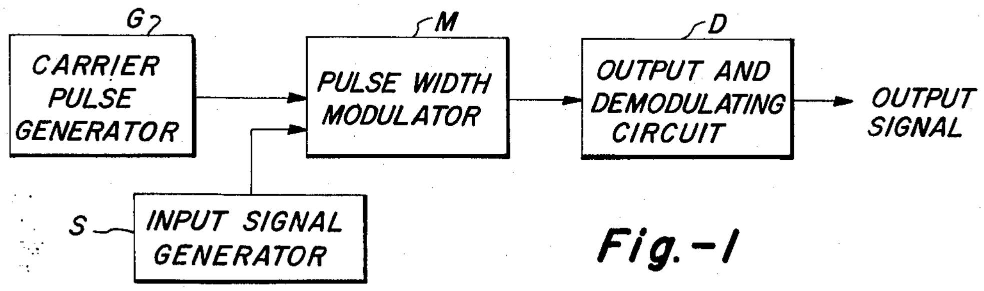
FIGURE 1 is a general block diagram of the invention.
Figure 3:
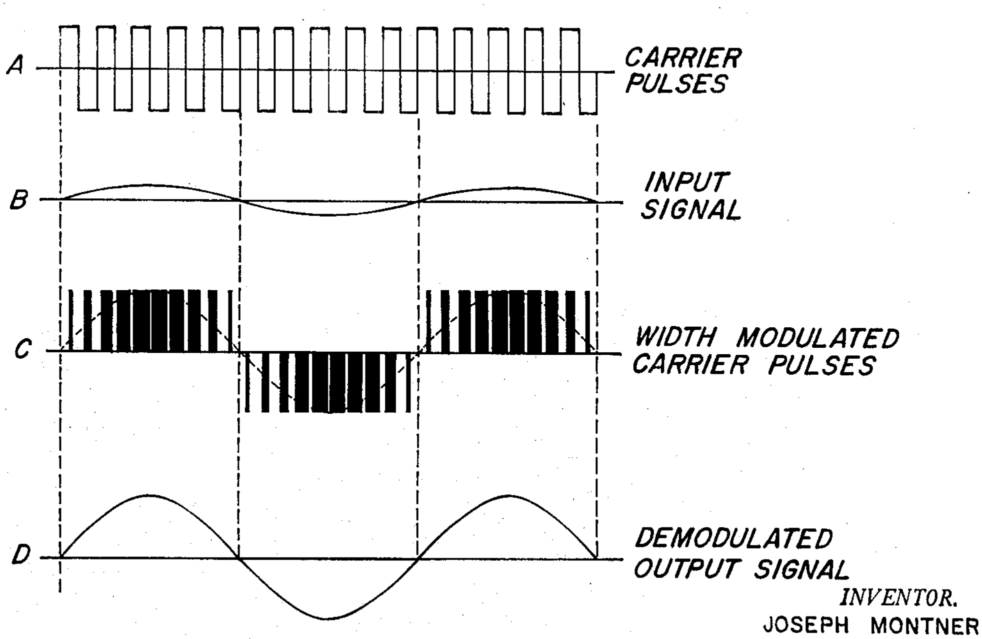
FIGURE 3 is a set of wave forms relating to FIGURES 1 and 2.

Referring to FIGURES 1 and 3, the basic principle of this invention involves generating a high frequency carrier (FIGURE 3A) in a square wave carrier pulse generator G, and applying the carrier to a pulse width modulator M. Modulator M modulates the carrier in accordance with an input signal (FIGURE 3B) which may be generated in a simple low power sinusoidal input signal generator S. The output of width modulator M is a train of width modulated pulses (FIGURE 3C) which are demodulated in a demodulating circuit D to produce a relatively large high power sinusoidal output signal (FIGURE 3D) having the same frequency and wave form as the input signal (FIGURE 3B).

Figure 2:
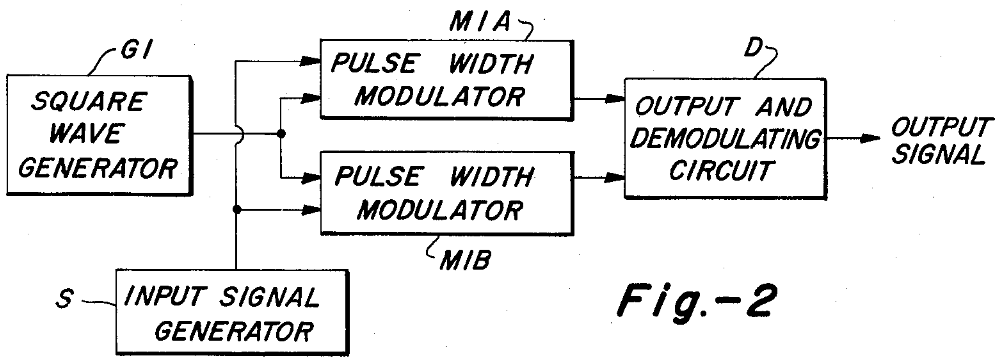
FIGURE 2 is a block diagram of a first species of the invention.

In a first species of the invention, shown in FIGURE 2, a square wave carrier (FIGURE 3A) is applied to two pulse width modulators M1A and M1B, which both receive the same input signal (FIGURE 3B). Each modulator is responsive to a different polarity of the input signal (FIGURE 3B), and each modulator produces width modulated pulses of a single polarity. When one modulator is operating the other is non-operable, and vice versa. The outputs of the two modulators are combined to form the train of width modulated pulses shown in FIGURE 3C. The outputs of modulators M1A and M1B can be combined within the modualtor circuits, but in this species of the invention it is convenient to combine the two outputs within the output and demodulating circuit D, for reasons which will be discussed in the specific embodiment of FIGURE 4. The width modulated pulses are demodulated in output and demodulating circuit D to produce the output signal shown in FIGURE 3D.

Figures 6, 7:
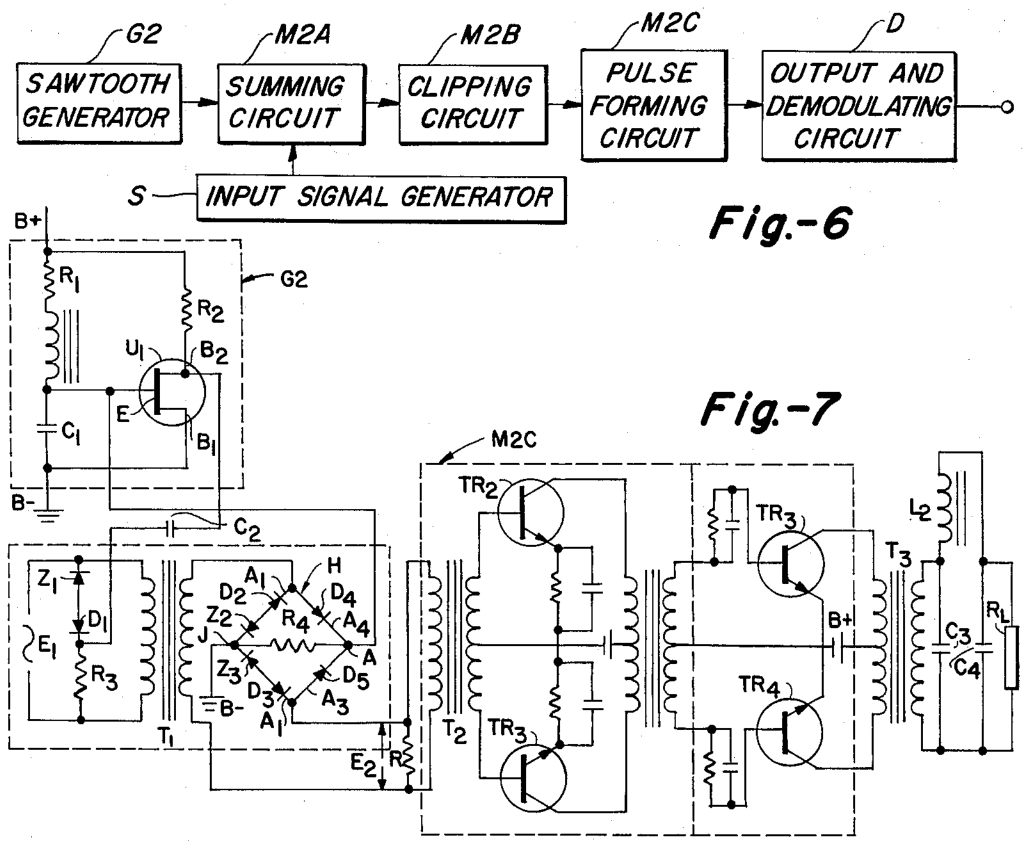
FIGURE 6 is a block diagram of a second species of the invention.
FIGURE 7 is a circuit diagram of a second embodiment of the invention.
Figure 8:
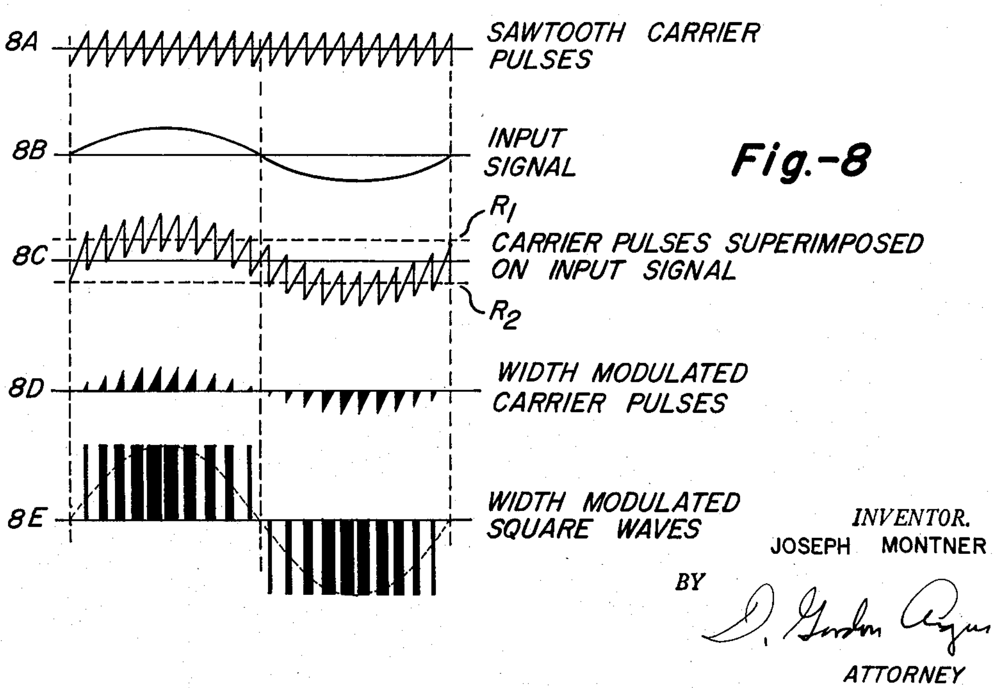
FIGURE 8 is a set of wave forms relating to FIGURES 6 and 7.

A second species of the invention is shown in FIGURES 6 and 7 and illustrated by the wave forms of FIGURE 8. In this species a D.-C. power supply drives a saw-tooth generator. The output of the saw-tooth generator (FIGURE 8A) is combined with a sinusoidal input signal (FIGURE 8B) in a summing circuit M2A to produce the wave form shown in FIGURE 8C. This signal is applied to a clipping circuit M2B. Clipping circuit M2B clips the wave form of FIGURE 8C at the reference levels R1 and R2 to produce the wave form shown in FIGURE 8D, in which each clipped saw-tooth has a polarity corresponding to the input signal polarity (FIGURE 8B) and a base width corresponding to the input signal amplitude. The clipped saw-tooth waves (FIGURE 8D) are applied to a pulse forming circuit M2C, which may be an overdriven amplifier, to produce a train of width modualted square waves (FIGURE 8E) each having the polarity and base width of its corresponding clipped saw-tooth (FIGURE 8D). The width modulated output of pulse forming circuit M2C is demodulated in an output and demodulating circuit D to produce the output signal. In this species of the invention circuits M2A, M2B, and M2C perform the functon of the pulse width modulator M shown in FIGURE 1.

Figure 4:
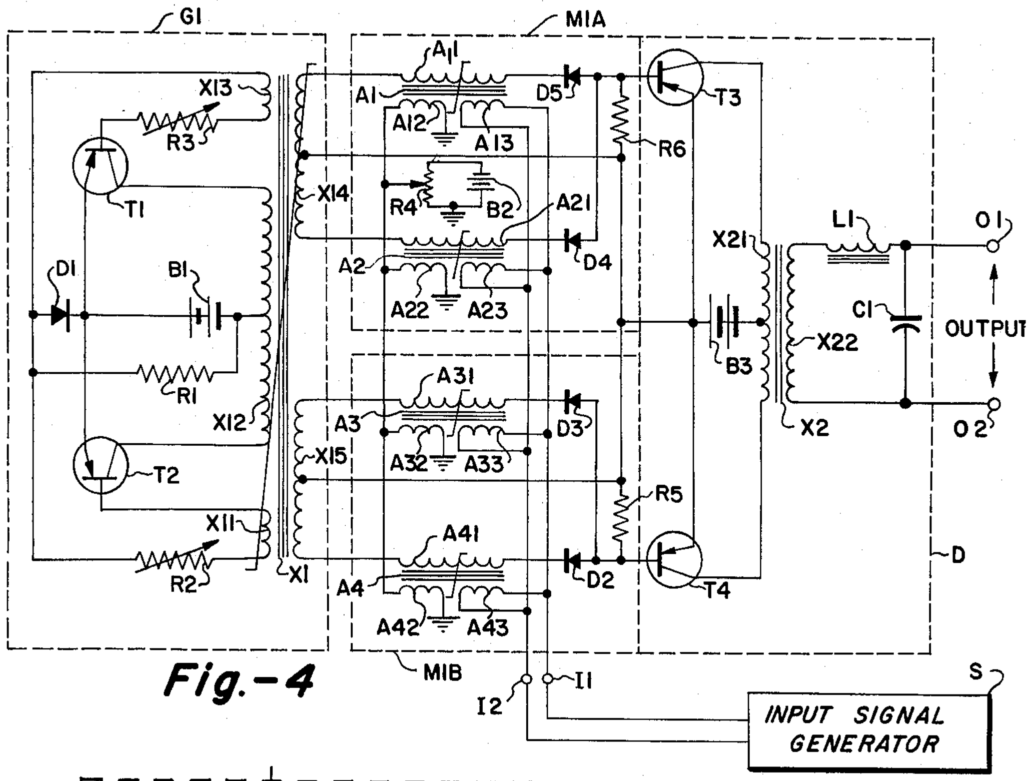
FIGURE 4 is a circuit diagram of one embodiment of the invention.

FIGURE 4 shows a specific embodiment of the invention in the first species comprising an input signal generator S, a square wave generator G1 powered by a D.-C. voltage supply B1, modulators M1A and M1B, and output-demodulating circuit D. These units which are indicated by the dotted boxes in FIGURE 4 are functionally interrelated as discussed above in connection with FIGURE 2.

Input signal generator S may be any suitable circuit for producing a low power sinusoidal input having the same frequency as the desired sinusoidal high power output signal. In this specific embodiment, the desired signal is a 400 cycle sine wave, and the input signal generator S may be a small 400 cycle phase shift oscillator.

Square wave generator G1 is a transistor inverter circuit well-known to those skilled in the art. It contains two PNP transistors T1 and T2 connected push-pull to primary winding X12 of transformer X1, which has a square loop core characteristic, and cross coupled through feedback windings X11 and X13. Battery B1 supplies the positive D.-C. voltage to the emitter of each transistor through a respective half of winding X12; resistors R1, R2, and R3 act as current limiting impedances, and diode D1 provides a starting bias for the circuit.

The polarity of feedback from feedback windings X11 and X13 is arranged such that an increase in collector current through transistor T1 induces a positive feedback to the base of transistor T1 and a cutoff bias to the base of transistor T2. Therefore, when transistor T1 begins to conduct it is driven very rapidly into saturation, while at the same time transistor T2 is driven very rapidly into cutoff. Then, a decrease in collector current through transistor T1 reverses the above noted feedback polarities, so that when collector current in transistor T1 begins to drop T1 is driven very rapidly into cutoff, while at the same time transistor T2 is driven very rapidly into saturation. Since the circuit is symmetrical, an increase in collector current through transistor T2 drives T2 to saturation and cuts off transistor T1, while a decrease in collector current through transistor T2 drives T2 to cutoff and saturates transistor T1.

In the operation of this circuit, conduction is very rapidly switched from one transistor to the other at a frequency determined by the magnetic saturation level of transformer X1, the number of turns in primary winding X12, and the voltage of battery B1. The switching occurs when the core of transformer X1 becomes saturated, at which time the feedback voltages induced in windings X11 and X13 drop, which decreases collector current through the conducting transistor, and switches conduction to the other transistor. When the core of transformer X1 becomes saturated in the other direction, conduction is switched again, and so on ad infinitum. The output of the circuit is an alternating current square wave voltage which appears across center-tapped output windings X14 and X15. High efficiency and compactness require the square wave output frequency to be substantially higher than the input frequency to terminals I1 and I2, and in this specific embodiment a square wave frequency of approximately 4 kilocycles has been found to be satisfactory.

Two identical pulse width modulators M1A and M1B are coupled to respective output windings X14 and X15 of transformer X1. Modulator M1A is responsive only to positive excursions of the input signal to input terminals I1 and I2, while modulator M1B is responsive only to negative excursions of the input signal. Each modulator is operable to width modulate its square wave carrier input in accordance with the signal level at input terminals I1 and I2 for the respective polarity of the input signal. When combined, the outputs of modulators M1A and M1B give the wave form shown in FIGURE 3C.

Referring to modulator M1A of FIGURE 4, the basic modulation circuit comprises a magnetic amplifier A1 connected in series with a load impedance R6 through a rectifier D5. Magamp A1 is a saturable reactor having a square loop core characteristic, with a load winding A11, bias winding A12, and signal winding A13. Load winding A11 presents a high impedance to carrier pulses when the magamp is unsaturated, whereby the carrier pulses are blocked from appearing across load impedance R6, and a low impedance when saturated, whereby the carrier pulses are passed through the magamp to appear across load impedance R6.

The initial core magnetisation of magamp A1 is controlled by bias winding A12 and signal winding A13. A bias voltage is derived from battery B2, and controlled by potentiometer R4, which is initially set such that the core of magamp A1 will remain unsaturated for the full duration of the carrier pulse with no signal input to winding A13, but will begin to saturate during a portion of the carrier pulse with a positive input to winding A13. The duration, or width, of the saturated state varies directly with the amplitude of the positive input to winding A13, as illustrated in the wave forms of FIGURE 5.

Figure 5:
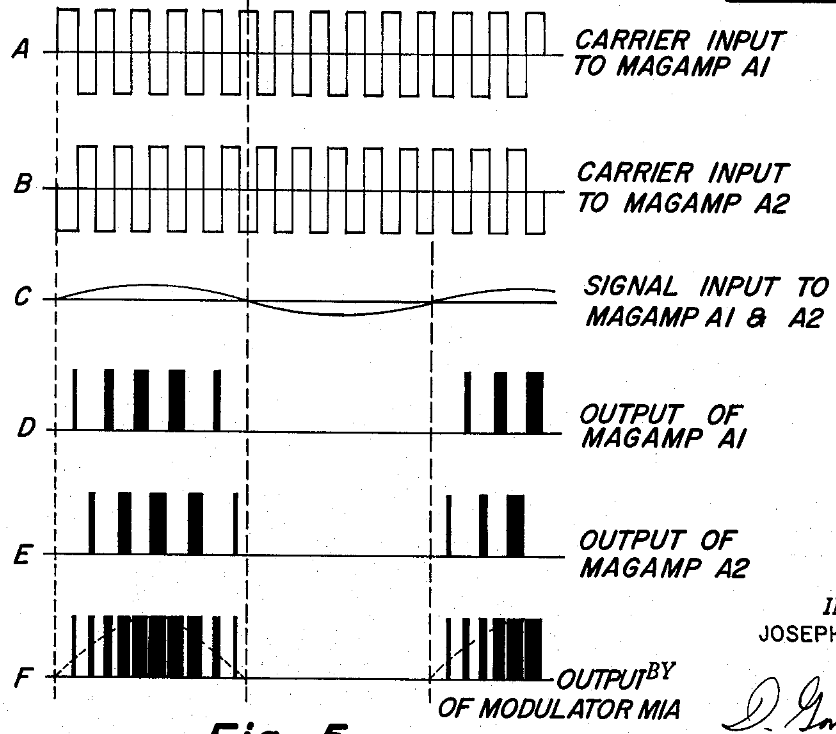
FIGURE 5 is a set of wave forms relating to FIGURES 2 and 4.

Referring to FIGURE 5, waveform A shows the carrier pulse input to load winding A11 of magamp A1. Only the positive pulses of wave form 5A are applied across winding A11, since the negative pulses are blocked by rectifier D5. When the first positive pulse is applied to winding A11, the core is unsaturated, and no pulse appears at the output. But since a small positive input signal is applied to winding A13, the core will saturate just before the positive carrier pulse ends, thus developing a narrow pulse output across load impedance R6, as shown in FIGURE 5D. When the next positive carrier pulse is applied across winding A11, the signal level at winding A13 is higher and the core saturates sooner, developing a wider output pulse, and so on until the signal level at A13 drops below zero, when the core remains unsaturated for the full width of each positive carrier pulse.

Modulator M1A could employ a single magamp modulator as described above, but it is preferable to employ two such magamps operating on alternate half cycles of the carrier pulse input. When a single magamp modulator is employed, the maximum output amplitude is limited to half of the carrier pulse amplitude, but with two magamp modulators, the maximum output amplitude equals the full carrier pulse amplitude. Accordingly, modulator M1A contains a second magamp A2 connected in parallel with magamp A1 through rectifier D4. Magamp A2 operates exactly like magamp A1, but since the carrier pulse input to magamp A2 is inverted, the positive carrier pulse input to magamp A2 occurs during the negative carrier pulse input to magamp A1, and magamps A1 and A2 accordingly operate on alternate half cycles of the carrier. The wave forms of FIGURE 5 show how the output of magamps A1 and A2 are combined in the common load impedance R6 to form the positive width modulated pulses shown in FIGURE 3C. The negative width modulated pulses shown in FIGURE 3C are formed in modulator M1B, which is functionally identical to modulator M1A, but responsive to negative input signals rather than positive input signals.

The bias and signal windings of each magamp are connected in parallel, as shown, but individual bias and signal amplitude controls may be incorporated for each winding if desired. This may be necessary in cases where the sensitivity of the individual magamps varies significantly, or where fidelity of reproduction is particularly critical. However, in inverter circuits, the individual controls are not ordinarily required.

Modulators M1A and M1B are preferably adjusted to give a high percentage of modulation, which is calculated by taking the ratio between carrier pulse width and modulated pulse width at maximum input signal. The percentage of modulation is a function of magamp sensitivity, carrier pulse width and amplitude, and input signal amplitude. It is not possible to specify these parameters in general, since they will differ in each embodiment of the invention, but the choice of these parameters for any given situation is well known to those skilled in the art. When the magamp sensitivity, carrier pulse width, and carrier pulse amplitude are fixed, percentage of modulation becomes a function of input signal alone, and may be controlled by an amplitude control in the input circuit.

The width modulated output pulses of modulators M1A and M1B are coupled to a push-pull output amplifier comprising PNP transistors T3 and T4, output transformer X2, and battery B3. Load impedances R5 and R6 act as input impedances for their respective transistors, thereby doubling in function as load impedances for the modulators and input impedances for the output amplifier.

It should be noted here that the push-pull output amplifier is not essential to the invention, since the output of the modulators could be coupled directly to transformer X2, or directly to the same end of a single ended transformer if desired. But in this specific embodiment of the invention it is expedient to operate the modulators at relatively low power, and to develop the output power in an output amplifier as shown. If no output amplifier is used, the power output of the invention will be limited to the power developed by the square wave generator minus modulation and coupling losses.

The amplified output signal of transformer X2 is coupled from secondary winding X22 to a simple compact fixed high frequency filter comprising inductance L1 and capacitance C1. The filter acts to demodulate or integrate the output signal by removing the high frequency components therefrom, and produces the demodulated output signal shown in FIGURE 3D, which appears between output terminals O1 and O2. The specific values for inductance L1 and capacitance C1 depends on the carrier frequency, input signal frequency, percentage of modulation, and degree of fidelity desired in the output. In general, the higher the carrier frequency the smaller the filter components required for any given fidelity.

In the embodiment shown in FIGURE 7, a D.-C. power supply is used to drive a conventional sawtooth generator G2 built around a unijunction transistor $U_1$. This sawtooth generator has a frequency of oscillation determined primarily by resistors R1 and R2 and capacitor C1 in the sawtooth generator circuit. In this embodiment, the frequency of oscillation of the sawtooth generator is set at about 4000 c.p.s.

Synchronization between the sawtooth high frequency output voltage shown in FIGURE 8 as waveform A and the low frequency sinusoidal input voltage shown in FIGURE 8 as waveform B is obtained by connecting a diode D1 and a zener diode Z in back-to-back relationship and in series with a current limiting resistor R3 across the terminals of the low power sinusoidal input voltage (FIGURE 8B) and in parallel with the primary coil of transformer $T_1$. A lead is connected between the plate of diode $D_1$ and the base $B_2$ of the unijunction transistor through filter capacitor $C_2$.

In order to both sum and clip the sawtooth signal (8A) and the sinusoidal input voltage (8B), the emitter E of the unijunction transistor $U_1$ is connected to junction A of a bridge-type circuit H. Arms $A_1$ and $A_2$ of the bridge circuit H each comprise zener diodes $Z_2$ and $D_2$ diode and zener diode $Z_3$ and diode $D_3$ in series with each other and in back-to-back relationship, as shown in FIGURE 7. Diodes $D_4$ and $D_5$ are in the remaining arms $A_3$ and $A_4$ of the bridge circuit H with a resistor $R_4$ connected between junction A and the grounded junction J between arms $A_1$ and $A_2$.

If the zener diodes $Z_2$ and $Z_3$ were eliminated from arms $A_1$ and $A_2$ the output signal from bridge H would be the sawtooth carrier (8A) superimposed on the sinusoidal input signal (8B) to produce waveform (8C). However, the zener diodes $Z_2$ and $Z_3$ exert a clipping effect on the superimposed signals, so that the output $E_2$ from the bridge type circuit H has waveform (8D). This requires that the amplitude from the sawtooth generator $G_2$ be set just below the critical voltages of zener diodes $Z_2$ and $Z_3$. The resultant clipped sawtooth pulses are width modulated in accordance with the sinusoidal input signal shown in diagram B of FIGURE 8.

The output $E_2$ from the bridge type circuit H is fed into the primary coil of the isolating transformer $T_2$. The secondary coil of the transformer drives a push-pull wave steepening power oscillator M2C including transistors $TR_2$ and $TR_3$ which has the effect of changing the sawtooth width modulated pulses to a constant amplitude width modulated square wave pulse.

If the desired wave shape and if sufficient power cannot be obtained from a single drive stage, additional drive stages with transistors $TR_3$ and $TR_4$ may be provided. Ultimately, however, the output of the drive stages will be a width modulated square wave pulse, as seen in 8E. This wave shape is the same as the wave form shown in FIGURE 2 produced by using a D.-C. source to drive a square wave generator.

The output of the drive stages is fed into the primary coil of transformer $T_3$ and the secondary coil of transformer $T_3$ is fed into an integrating or fixed frequency low-pass filter comprising capacitors $C_3$ and $C_4$ and inductance $L_2$. This simple arrangement demodulates or integrates the pulse width modulated signal to produce a high power sinusoidal output voltage across the load $R_L$.

From the foregoing description it will be apparent that this invention provides a novel inverter employing pulse width modulation to increase the efficiency, fidelity, reliability, and compactness thereof. And it should be understood that this invention is not limited to the specific structures disclosed herein, since many modifications can be made in the structure disclosed without departing from the basic teaching of this invention. For example, in the embodiment disclosed in FIGURE 4 a different square wave generator circuit might be employed, and a single-ended output amplifier might be used in place of the push-pull amplifier shown, and the output of modulators M1A and M1B might be coupled directly to the output transformer X2. These and many other modifications will be apparent to those skilled in the art, and this invention includes all modifications falling within the scope of the following claims.

I claim:

1. An electrical inverter for converting the output of a D.-C. power supply to a high power low frequency sinusoidal voltage, said electrical inverter comprising: a carrier pulse generator operable to produce high frequency carrier pulses, said carrier pulse generator comprising a generator having a square wave output; a pulse width modulator having first and second input means and output means, said carrier pulses being coupled to said first input means, said second input means being adapted to receive a low power low frequency sinusoidal input signal, said pulse width modulator being operable to width modulate said carrier pulses in accordance with said sinusoidal input signal to produce a train of width modulated pulses at the output means thereof, whereby each of said width modulated pulses have a width proportional to the corresponding instantaneous value of said sinusoidal input signal, and each of said width modulated pulses have a polarity with respect to a reference level, the polarity of each width modulated pulse being related to the corresponding instantaneous polarity of said input signal; said pulse width modulator comprising first and second pulse width modulators, said carrier square wave output being coupled to both pulse width modulators and said input signal being coupled to both pulse width modulators, said first pulse width modulator being responsive to one polarity of said input signal and non-responsive to the other polarity thereof, said second pulse width modulator being responsive to the other polarity of said input signal and non-responsive to said one polarity thereof, and each pulse width modulator being operable to width modulate said square waves in accordance with the instantaneous magnitude of said input signal for the respective polarity thereof; and an output circuit having input means and output means, whereby said train of width modulated pulses are coupled to the input means thereof, and said output means thereof include a fixed high frequency filter for removing the high frequency components from said train of width modulated pulses to produce a high power sinusoidal signal having the same frequency as said input signal.

2. An electrical inverter as defined in claim 1 wherein said means for combining the output of said first and second pulse width modulators comprises a second transformer having a center-tapped primary and a secondary winding, the center tap of said primary winding being coupled to a reference source, one end of said primary winding being coupled to the output of said first pulse width modulator, the other end of said primary winding being coupled to the output of said second pulse width modulator, and said fixed high frequency filter being coupled to the secondary winding of said second transformer.

3. An electrical inverter-amplifier as defined in claim 1 and also including a push-pull power amplifier coupled between said second transformer and the output of said first and second pulse width modulators, said second transformer comprising the output transformer of said push-pull amplifier, one input of said push-pull power amplifier being coupled to the output of said first pulse width modulator, and the other input of said push-pull power amplifier being coupled to the output of said second pulse width modulator.

4. An electrical inverter as defined in claim 1 wherein said first and second pulse width modulators each contain a rectifier and a load impedance and a saturable reactor having a substantially rectangular magnetization curve, said saturable reactors each having a load winding and a signal winding, the load winding of each saturable reactor being coupled in series with the corresponding rectifier and load impedance, said square wave carrier being coupled to the load winding of each saturable reactor, said signal input being coupled to the signal winding of each saturable reactor, and said width modulated pulses being developed across said load impedances.

5. An electrical inverter as defined in claim 4 wherein said first and second pulse width modulators each contain a load impedance, two rectifiers, and two saturable reactors having a substantially rectangular magnetization curve, each saturable reactor having a load winding and a signal winding, the load winding of each saturable reactor being coupled in series with a respective diode and the corresponding load impedance to form a series-parallel circuit with two load windings coupled in parallel to a common load impedance, and said square wave carrier being coupled to the load winding of one of said two load windings; means for inverting said square wave carrier, and said inverted square wave carrier being coupled to the other of said two load windings; said rectifiers being connected such that said two load windings respond to alternate half cycles of said square wave carrier, and said signal input being coupled in parallel to said signal windings of said two saturable reactors and said width modulated pulses being developed across said common load impedance.

6. An electrical inverter as defined in claim 5 wherein said square wave generator contains an output transformer having two center-tapped secondary windings, and wherein said center-tapped secondary windings comprise said means for inverting said square wave carrier, and wherein one end of each center tapped secondary winding is coupled to one of said two load windings of a corresponding pulse width modulator, and wherein the other end of each center-tapped secondary winding is coupled to the other of said two load windings of the corresponding pulse width modulator.

7. An electrical amplifier as defined in claim 6 wherein each saturable reactor contains bias means operable to set the initial magnetization thereof, and wherein each saturable reactor is biased to be initially unsaturated, said bias being set such that each saturable reactor will remain unsaturated during the full width of a square wave signal applied to the load winding thereof when no signal input is applied to said signal input winding thereof, and said saturable reactors each being operable to be saturated during a time increment of a square wave signal applied to the load winding thereof when an input signal is applied to the signal winding thereof, and said time increment being proportional to the amplitude of said input signal.

References Cited by the Examiner

UNITED STATES PATENTS

| | | | |
|---|---|---|---|
| 2,798,970 | 7/1957 | Hill et al. | 332—1 |
| 2,868,877 | 1/1959 | Hooper et al. | 179—1 |
| 2,959,725 | 11/1960 | Younkin | 321—12 |
| 2,990,516 | 6/1961 | Johannessen | 330—10 |
| 3,079,568 | 2/1963 | Werth | 330—10 |
| 3,125,726 | 3/1964 | McCarthy Clifton | 332—12 |
| 3,136,960 | 6/1964 | Ausfresser | 332—12 |

FOREIGN PATENTS

| | | |
|---|---|---|
| 970,193 | 6/1950 | France. |

ROY LAKE, *Primary Examiner.*

NATHAN KAUFMAN, *Examiner.*